Patented Nov. 22, 1938

2,137,667

UNITED STATES PATENT OFFICE 2,137,667

MODIFYING NATURAL FATS, OILS, AND WAXES

William R. Eipper, Dallas, Pa., assignor to Industrial Chemical Research Company, Wilkes-Barre, Pa.

No Drawing. Application December 8, 1936, Serial No. 114,866

10 Claims. (Cl. 99—23)

This invention is a process of modifying the physical properties of natural fats, oils and waxes with particular reference to the edible varieties such as are used in candies and other confections.

Generally speaking, the invention contemplates the formation of esters from free or liberated fatty acids and alcohols, which esters will possess physical characteristics such as viscosity, specific gravity, melting point and the like that are appreciably different from those of the natural oils and fats in which the fatty acids employed naturally occur. The invention is capable of general application in processing natural oils, fats, waxes and the like of vegetable and/or animal origin, and by properly choosing the alcohol to be esterified with a given free or liberated fatty acid, resulting products may be obtained having specific gravities or melting points either greater or less than those of the corresponding natural fats or oils, depending upon whether the alcohol so chosen has a greater or lesser molecular weight than the alcohol with which the said fatty acid is esterified in said natural fat or oil. By way of example of natural fats and oils which may be processed in accordance with the present invention, I give the following, but it is understood these are merely representative of all natural fats and oils of animal or vegetable origin, namely:

Vegetable oils or fats:
 Chocolate
 Palmitin
 Cocoanut oil
 Castor oil
 Japan wax
 Linseed oil Animal oils or fats:
 Stearin
 Lard
 Lanolin
 Menhaden oil
 Whale oil
 Butter Although, as stated, the invention may be employed either to raise or lower the specific gravity and/or melting point and similar physical properties of natural animal and vegetable oils and fats, it is of particular importance and utility in raising the melting point and associated physical properties of edible oils and fats to prevent and/or retard the tendency of such compounds to become unstable, soften (in case of normally solid compounds), and become rancid due to oxidation when subjected to certain atmospheric and/or temperature changes. These deleterious effects are all evident as a result of even slightly elevated temperatures such as occur during the summer, and are manifest by a general loss of flavor, unpalatableness, and objectionable odors. This is particularly true in the case of such edible oils and fats as lard, butter and the like, whereas in such fats as cocoa fat present in chocolate and chocolate confections, the results are manifest by the well known discoloration of the products generally referred to as "frosting" or "bloom".

The present invention has for its principal object, therefore, the esterification of fatty acids obtained from natural fats and oils of animal or vegetable origin for the purpose of producing synthetic esters or ester compounds having predetermined physical characteristics such as viscosity, specific gravity, melting point and the like, and particularly to raise the melting point of edible fats and oils whereby to render the same more stable and to prevent deterioration thereof due to atmospheric and/or temperature changes to which they may be subject.

Generally speaking, the invention contemplates breaking down completely the natural fat or oil into its constituent fatty acid and alcohol radicals, and then removing all the alcohol radical and substituting in its place an alcohol having a different molecular weight. If it is desired to lower the melting point an alcohol is chosen having a lesser molecular weight than that of the alcohol for which it is substituted, whereas if a resulting product having a higher melting point than the original product is desired, an alcohol is substituted which has a greater molecular weight than the original alcohol.

As indicated above, the invention contemplates first breaking down the natural oil or fat into its constituent radicals. This may be accomplished by any well known method, such as direct saponification or by the Twitchell process.

The entire free or liberated fatty acid separated from the natural fat by any chemical reaction such as indicated, is treated to cause it to esterify with an alcohol having the desired number of hydroxyl groups or molecular weight, which, when combined with said free fatty acid, will yield an ester having the desired melting point. As indicated above, the alcohol chosen for reaction with the free fatty acid may have a greater or lesser molecular weight or number of hydroxyl groups than the alcohol for which it is to be substituted. Inasmuch as the esters of natural animal or vegetable oils and fats are glycerides, it is apparent that if a resulting product having a lower melting point than that of the original fat is desired, a mono or a dihydric alcohol is chosen, whereas if a resulting product having a melting point higher than that of the original product is desired, a tetra-, penta- or hexa-hydric alcohol is chosen. While any of the alcohols of a given group may be employed, it is desirable, although not necessary, when seeking to modify the melting point of an edible fat or oil, to employ an alcohol which may be readily assimilated by the digestive tract. Thus, in instances where it is desired to raise the melting point of an edible fat or oil, I prefer to use a hexa-hydric alcohol resulting from the reduction of one of the saccharides. The saccharide employed may be either a mono-saccharide such as grape sugar, otherwise known as dextrose or glucose, or I may employ a poly-saccharide such as starch, cane sugar or the like.

The free fatty acid and the saccharide in the form of hexa-hydric or other desired alcohol are combined or esterfied in molecular proportions to produce a synthetic oil or fat having the desired lowered or elevated melting point. This reaction is performed in a closed system in which the air has been replaced by an inert gas, such as nitrogen or $CO_2$, and wherein an appreciable vacuum obtains. A suitable catalyst is employed to facilitate the esterification of the free fatty acid with the alcohol, and it is essential that all of the reagents be substantially anhydrous, since the continued presence or accumulation of moisture in the system has a deleterious effect upon the desired reaction. With this in mind I choose a catalyst having a marked affinity for water, such as anhydrous aluminum sulphate, anhydrous copper sulphate or the like.

By way of example, I may, by direct saponification or the Twitchell process, treat say 100 pounds of a natural animal and vegetable fat or oil to free the fatty acid content thereof. Thus, from 100 pounds of cocoa butter this reaction will yield approximately 10 percent of glycerol and 90 pounds of free fatty acid, the latter of which is placed in a suitable system together with approximately 5 pounds of the desired saccharide in the form of hexa-hydric alcohol and approximately 1 pound or 1¼ pounds of anhydrous aluminum sulphate or anhydrous copper sulphate. The system is closed and the air therein displaced by an inert gas such as nitrogen or carbon dioxide and the pressure within the system reduced to approximately 150 mm. The temperature in the system is then slowly raised above 100° C., preferably between 125 and 135° C. The esterification reaction starts at approximately 130° C. under the noted pressure, and these conditions of temperature and pressure are substantially maintained for approximately two or three hours, the contents of the system being gently agitated. At the expiration of the time the temperature may be brought quickly to approximately 190° C. and the pressure further reduced to approximately 130 mm. These conditions of temperature and pressure are maintained for approximately two or three hours or until the reaction is complete, which point may be ascertained by a conventional test for acidity. The operating pressure in the system is then reduced to atmospheric while still being maintained inert and the esterified fat allowed to cool below 100° C. Water then may be admitted to the system to wash the esterified fat or oil, after which the esterified fat or oil may be removed from the system and allowed to cool and/or solidify.

If desired, catalysts other than anhydrous aluminum sulphate and anhydrous copper sulphate may be employed, such as, for instance, powdered zinc. In cases where powdered zinc is employed, however, care must be taken to remove and condense the aqueous vapors as formed inasmuch as the accumulation thereof in the system would retard and finally stop the reaction. It is also to be noted that in using powdered zinc with fatty acids, a reaction may occur between the zinc and the acid resulting in the formation of certain zinc soap compounds, and this requires the use of suitable solvents such as ethyl acetate or ethylene dichloride to dissolve the synthetic or esterified fat or oil, leaving the insoluble zinc soaps in solid form. The solution of esterified fats or oils is then distilled in a well known manner for the recovery of the fat or oil.

Any of the natural fats or oils whether normally liquid or solid, may be treated in the manner hereinbefore set forth for the purpose of raising or lowering the melting point thereof. I have outlined in detail the method of bringing about the reaction between the separated free fatty acid and the alcohol with which it is to be combined, and the proportions noted above are true generally regardless of the natural fat or oil being treated, due to the substantially uniform ten percent of glycerol in most natural animal or vegetable oils and fats. Naturally there is a small variation, plus or minus, in respect to the actual content of glycerol present in a given fat or oil, but this variation is purely one of degree and not of kind, and the reagents if combined in molecular proportions under the conditions noted will produce compounds having the desired melting points.

As indicated above, my process is of particular utility in treating edible fats and oils which are subject to rapid deterioration when subjected to normal summer temperatures. Chocolate, for instance, not only loses its flavor, but becomes decidedly unsightly due to the grey bloom which characterizes the deleterious changes resulting from atmosphere or temperature changes, and my invention may be effectively employed for entirely precluding these deleterious effects upon chocolate and chocolate compounds and confections. As is well known, chocolate comprises substantially 50 to 56 percent of cocoa butter fat in glyceride form, and it is the relatively low melting point of these substances which is responsible for the deleterious effect of temperature changes noted. In treating chocolate I extract by sweating or any other well known method, substantially one-half of the cocoa butter fat content thereof and treat this fat in the manner above noted. The resulting modified or synthetic fat is then combined with the original chocolate residue, namely, that portion of the original chocolate remaining after the cocoa butter fat has been extracted. This may conveniently be done by melting the two with agitation until the mixture is homogeneous. The resulting product will have a melting point of substantially 120° F. as compared with the melting point of 88 to 92° F. of natural chocolate. The modified chocolate will therefore be stable at all normal atmospheric temperatures and will not deteriorate as a result of temperature changes or manifest the deleterious grey bloom hereinbefore referred to and which characterizes all conventional chocolate preparations today.

It is to be noted that the melting point of hexahydric alcohol is approximately 115° C. Thus, when this material is substituted for a trihydric alcohol, such as glycerine, which is liquid at all normal atmospheric temperatures, it is possible that a resulting synthetic fat or oil will be produced which may have a melting point somewhat higher than is desirable when the particular material being treated, or the use to which it is placed, is considered. Thus, for example, if butter, in being treated to render the same more stable and less likely to melt when subjected to summer temperatures, is esterified with a hexahydric alcohol, the resulting synthetic or modified fat or butter would be characterized by a melting point of substantially 40 to 50° C., which may be higher than desirable in some localities for table use, due, for instance, to its inability to be readily spread. This condition can be easily remedied by admixing with the synthetic or modified butter a portion of untreated butter, the two ingredients being mixed in the proportions necessary to provide a resulting product of the desired degree of consistency, etc. Thus, if the treated or modified butter has a melting point of approximately 50° C. a butter having a melting point of substantially 100 to 110° F. is desired, a mixture of substantially four parts of modified butter with one part of natural butter will yield the desired product. This blending or tempering of the final product should be accomplished by melting the two ingredients under low heat with gentle agitation until homogeneous and then allowing the same to solidify.

Similarly, when modifying chocolate with a view to controlling its stability and melting point, the percentage of cocoa butter fat extracted from the original chocolate may be proportioned as desired to give a final product having the desired consistency and stability. Thus, if it is found that esterifying substantially half of the butter fat content of chocolate yields a product too hard or dense when the prevailing temperatures of a given locality are considered, the difficulty may be remedied by employing a lesser percentage of cocoa butter fat in the esterifying process, thus leaving a greater percentage of the natural cocoa butter fat unmodified. This procedure will result in a modified cocoa butter fat or chocolate which will have a lower melting point than a modified chocolate in which a greater percentage of the cocoa butter fat has been treated. Similarly, of course, by treating larger percentages of cocoa butter fat content than indicated above, a resulting modified chocolate may be provided with a still higher melting point, if desired.

It is important to note that most edible fats which are solid at normal temperatures are characterized by the fact that the softening point and the melting point are widely separated on the temperature scale. This is particularly true of both butter and chocolate. One important result accomplished by esterifying the fatty acid constituents of these fats in accordance with my invention is to move the temperature of the softening point and the temperature of the melting point closer together so that the esterified product remains firm almost up to the temperature of melting.

From the foregoing description it is apparent that I have invented a method of modifying or controlling the viscosity, specific gravity, melting point and the like of natural fats and oils, whether liquid or solid, by substituting for all the alcohol present in the fatty acid constituents of such compounds, an alcohol having a greater or lesser molecular weight or number of hydroxyl groups than the original alcohol present in the natural fat, depending upon whether the melting point of the final product is to be higher or lower than that of the original natural fat or oil. Furthermore, by substituting a hexahydric alcohol derived from one of the saccharides for the glycerol radical present in natural edible animal and vegetable fats and oils, not only am I able to produce a resulting composition having an elevated melting point, but also one which is readily digestible and which may be easily assimilated by the digestive tract. Furthermore, while my invention is of general utility and application for the purpose of modifying the melting points of natural vegetable and animal fats and oils in the manner indicated, it is of particular utility in treating chocolate, chocolate compounds and confections for the purpose of preventing and/or reducing the tendency of these compounds to deteriorate under the influence of atmospheric and temperature changes, with the resulting deleterious manifestation of bloom.

It will be understood that where I have referred in the specification and appended claims to the "ester", "synthetic esters", and "ester compounds" resulting from the esterification of the fatty acid constituents of a natural edible fat or oil with a saccharide alcohol, etc., I refer to the complex ester compounds resulting from the complete esterification of molecular proportions of said fatty acid constituents and said alcohol as herein described.

Having thus described the invention, what I claim as new is:

1. A synthetic non-blooming chocolate containing an ester comprising a hexa-hydric alcohol derived from one of the saccharides completely esterified in molecular proportion with the fatty acid constituents of natural chocolate, said ester being present in sufficient quantity to prevent blooming.

2. A synthetic non-blooming chocolate containing an ester comprising a saccharide alcohol having a molecular weight greater than that of glycerol completely esterified in molecular proportion with the fatty acid constituents of natural chocolate, said ester being present in sufficient quantity to prevent blooming.

3. A synthetic non-blooming chocolate containing an ester comprising an alcohol derived from one of the monosaccharides and having a molecular weight greater than that of glycerol completely esterified in molecular proportion with the fatty acid constituents of natural chocolate, said ester being present in sufficient quantity to prevent blooming.

4. A synthetic non-blooming chocolate containing an ester comprising an alcohol derived from one of the polysaccharides and having a molecular weight greater than that of glycerol completely esterified in molecular proportion with the fatty acid constituents of natural chocolate, said ester being present in sufficient quantity to prevent blooming.

5. A synthetic non-blooming chocolate containing approximately twenty-five percent by weight of an ester comprising a saccharide alcohol having a molecular weight greater than that of glycerol completely esterified in molecular proportion with the fatty acid constituents of a natural chocolate.

6. A synthetic edible fat or oil containing an ester designed to stabilize the low melting point fatty acid constituents thereof against deterioration due to temperature change, said ester comprising an alcohol derived from one of the saccharides and having a molecular weight greater than that of glycerol completely esterified in molecular proportion with the fatty acid constituents of a natural edible fat or oil, said ester being present in sufficient quantity to stabilize the low melting point fatty acid constituents of said fat or oil.

7. A synthetic butter containing an ester designed to stabilize the low melting point fatty acid constituents thereof against deterioration due to temperature change, said ester comprising an alcohol derived from one of the saccharides and having a molecular weight greater than that of glycerol completely esterified in molecular proportion with the fatty acid constituents of natural butter, said ester being present in sufficient quantity to stabilize the low melting point fatty acid constituents of the butter.

8. The method of stabilizing the low melting point fatty acid constituents of a natural edible fat or oil against deterioration due to temperature changes comprising completely esterifying molecular proportions of the fatty acid constituents of said natural fat or oil and an alcohol derived from one of the saccharides and having a greater molecular weight than that of glycerol, and adding said ester to said natural fat or oil in quantity sufficient to stabilize the low melting point fatty acid constituents thereof.

9. The method of stabilizing the low melting point fatty acid constituents of butter against deterioration due to temperature changes comprising completely esterifying molecular proportions of the fatty acid constituents of natural butter and an alcohol derived from one of the saccharides and having a greater molecular weight than that of glycerol, and adding said ester to natural butter in quantities sufficient to stabilize the low melting point fatty acid constituents thereof.

10. The method of preventing bloom in chocolate comprising completely esterifying molecular proportions of the fatty acid constituents of natural chocolate and an alcohol derived from one of the saccharides and having a greater molecular weight than that of glycerol, and adding said ester to natural chocolate in quantities sufficient to prevent bloom in the chocolate.

WILLIAM R. EIPPER.